United States Patent
Tsurugi et al.

(10) Patent No.: US 8,809,490 B2
(45) Date of Patent: *Aug. 19, 2014

(54) METHOD FOR PRODUCING UNSATURATED CARBOXYLIC ACID-MODIFIED VINYL ALCOHOL POLYMER, AND GAS BARRIER FILM OR GAS BARRIER LAMINATE USING THE SAME

(75) Inventors: Kou Tsurugi, Chiba (JP); Yoshihisa Inoue, Chiba (JP); Isao Hara, Chiba (JP); Hiroyoshi Watanabe, Chiba (JP); Tomoyoshi Hakamata, Ibaraki (JP); Akira Nomoto, Ibaraki (JP); Osamu Nakamura, Ibaraki (JP)

(73) Assignee: Tohcello Co., Ltd., Tokyo (JP)

( * ) Notice: Subject to any disclaimer, the term of this patent is extended or adjusted under 35 U.S.C. 154(b) by 1396 days.

This patent is subject to a terminal disclaimer.

(21) Appl. No.: 12/302,993

(22) PCT Filed: May 31, 2007

(86) PCT No.: PCT/JP2007/061499
§ 371 (c)(1),
(2), (4) Date: Apr. 10, 2009

(87) PCT Pub. No.: WO2007/142279
PCT Pub. Date: Dec. 13, 2007

(65) Prior Publication Data
US 2009/0324836 A1    Dec. 31, 2009

(30) Foreign Application Priority Data
Jun. 2, 2006 (JP) .................. 2006-155031

(51) Int. Cl.
| C08F 8/14 | (2006.01) |
| C08F 16/06 | (2006.01) |
| C08L 29/04 | (2006.01) |
| C08F 6/08 | (2006.01) |
| C08F 6/02 | (2006.01) |
| B01J 41/04 | (2006.01) |
| C08F 6/00 | (2006.01) |

(52) U.S. Cl.
CPC ... *C08F 6/02* (2013.01); *C08F 8/14* (2013.01); *B01J 41/04* (2013.01); *C08F 6/003* (2013.01)
USPC ......... 528/486; 427/385.5; 428/35.4; 525/59; 525/61

(58) Field of Classification Search
USPC .......................... 525/56–62, 330.2; 428/35.4; 524/430–433; 528/486; 427/385.5
See application file for complete search history.

(56) References Cited

U.S. PATENT DOCUMENTS

| 2,940,948 | A | * | 6/1960 | Halbig et al. ................. 524/557 |
| 5,373,034 | A | | 12/1994 | Wang et al. |
| 5,919,597 | A | | 7/1999 | Sinta et al. |
| 6,022,913 | A | | 2/2000 | Tanaka et al. |
| 6,743,748 | B2 | * | 6/2004 | Mizuno et al. ................. 502/254 |
| 2002/0197480 | A1 | * | 12/2002 | Umekawa et al. ............ 428/413 |
| 2007/0142620 | A1 | * | 6/2007 | Vicari et al. ................... 528/480 |
| 2008/0262179 | A1 | * | 10/2008 | Nakamura et al. ............ 526/241 |
| 2009/0269592 | A1 | * | 10/2009 | Hakamata et al. ............ 428/446 |

FOREIGN PATENT DOCUMENTS

| DE | 3322993 A1 | 3/1985 |
| JP | 3-281542 A | 12/1991 |
| JP | 3-290419 A | 12/1991 |
| JP | 03290419 A | * 12/1991 |
| JP | 10-237180 A | 9/1998 |
| JP | 11-249308 A | 9/1999 |
| JP | 2001-288214 A | 10/2001 |
| JP | 2002-256076 A | 9/2002 |
| JP | 2004-299173 A | 10/2004 |
| WO | WO 2007026935 A1 | * 3/2007 |

OTHER PUBLICATIONS

Derwent abstract of JP 03290419 (Acc. No. 1992-045747, Dec. 1991, to show equivalence with JP 252735).*
G. Manecke et al."Immobilisierung von Corynebakterium simplex durch Photovernetzung von vinyliertem Polyvinylalkohol zur mikrobiologischen Steroidumwandlung, Angewandte Makromolekulare Chemie," vol. 113; 1983; pp. 179-202.
International Search Report of PCT/JP2007/061499, date of mailing Aug. 14, 2007.
Mühlebach, A. et al.; "New Water-Soluble Photo Crosslinkable Polymers Based on Modified Poly (vinyl alcohol)"; Journal of Polymer Science: Part A Polymer Chemistry, vol. 35, (1997), pp. 3603-3611.

* cited by examiner

*Primary Examiner* — Brieann R Fink
(74) *Attorney, Agent, or Firm* — Westerman, Hattori, Daniels & Adrian, LLP

(57) ABSTRACT

A method for producing a solution containing at least an unsaturated carboxylic acid-modified vinyl alcohol polymer is characterized by reacting a vinyl alcohol polymer and an unsaturated carboxylic acid compound in the presence of an acid catalyst soluble in the reaction system or a solid acid catalyst, and a gas barrier film is obtained by using the same. An example thereof is a method for producing a solution (A) containing an unsaturated carboxylic acid-modified vinyl alcohol polymer (b), the method comprising following two steps of: (1) a reaction step in which the unsaturated carboxylic acid-modified vinyl alcohol polymer (b) is formed by reacting a vinyl alcohol polymer and an unsaturated carboxylic acid compound (a) in the presence of an acid catalyst soluble in the reaction system; and (2) an ion exchange step in which at least the acid catalyst of acidic compounds is removed by an anion exchange resin.

26 Claims, No Drawings

METHOD FOR PRODUCING UNSATURATED CARBOXYLIC ACID-MODIFIED VINYL ALCOHOL POLYMER, AND GAS BARRIER FILM OR GAS BARRIER LAMINATE USING THE SAME

TECHNICAL FIELD

The present invention relates to a method for producing an unsaturated carboxylic acid-modified vinyl alcohol polymer (b), and a gas barrier film using the same. More particularly, the present invention relates to (1) a method for producing a solution containing an unsaturated carboxylic acid-modified vinyl alcohol polymer (b) comprising reacting a vinyl alcohol polymer and an unsaturated carboxylic acid compound (a) in the presence of an acid catalyst soluble in the reaction system, removing at least the acid catalyst among acidic compounds with an anion exchange resin, and as necessary, neutralizing the unsaturated carboxylic acid compound (a) with a polyvalent metal compound; (2) a method for producing a solution containing an unsaturated carboxylic acid-modified vinyl alcohol polymer (b) comprising reacting a vinyl alcohol polymer and an unsaturated carboxylic acid compound (a) in the presence of a solid acid catalyst, removing the solid acid catalyst by filtration and the like, and as necessary, removing the unsaturated carboxylic acid compound (a) with an anion exchange resin or neutralizing the unsaturated carboxylic acid compound (a) with a polyvalent metal compound; and, a gas barrier film using the same.

A solution containing the unsaturated carboxylic acid-modified vinyl alcohol polymer (b) obtained in methods (1) and (2) described above is useful as a gas barrier coating material, and a gas barrier film using this solution has high gas barrier properties.

BACKGROUND

Previously reported examples of methods for producing unsaturated carboxylic acid-modified vinyl alcohol polymers (b) consist mainly of [1] a method comprising reacting (meth) acrylic acid chloride and polyvinyl alcohol in an organic solvent (see Patent Document 1), and [2] a method comprising reacting (meth)acrylic acid anhydride and polyvinyl alcohol in an organic solvent (see Patent Document 2).

In the above-mentioned methods of [1] and [2], a chloride or anhydride of (meth) acrylic acid is used as an esterification agent to enhance the reactivity of polyvinyl alcohol. However, chlorides and anhydrides of (meth) acrylic acid are expensive and not readily available industrially. Moreover, since a reprecipitation procedure using an organic solvent as a poor solvent is carried out for purification, these production methods cannot be said to be industrially advantageous methods.

Consequently, studies, although extremely few in number, have been conducted on the synthesis of unsaturated carboxylic acid-modified vinyl alcohol polymers using industrially inexpensive and readily available unsaturated carboxylic acids as raw materials, a known example of which consists of [3] a method comprising reacting (meth)acrylic acid with polyvinyl alcohol in aqueous hydrochloric acid (see Non-Patent Document 1). However, since the method of [3] uses dialysis for purification, it is not an industrially advantageous production method.

In addition, in addition to the method of [3] above, another known method consists of [4] reacting polyvinyl alcohol, acetic acid and (meth)acrylic acid using hydrochloric acid as an acid catalyst (see Non-Patent Document 2). However, the method of [4] requires the addition of acetic acid, and the resulting modified vinyl alcohol polymer contains not only a (meth)acrylic acid of an unsaturated carboxylic acid compound, but also an acetic acid of a saturated carboxylic acid compound. Moreover, since purification is carried out by a reprecipitation procedure using an organic solvent for the poor solvent, this is not an industrially advantageous production method.

Accordingly, a sufficiently industrially advantageous method for producing unsaturated carboxylic acid-modified vinyl alcohol polymers has yet to be known.

Moreover, a gas barrier film using an unsaturated carboxylic acid-modified vinyl alcohol polymer obtained according to the methods described above is also not known.

[Patent Document 1] US Patent No. 5373034
[Patent Document 2] German laid-Open Patent No. 3322993
[Non-Patent Document 1] Angewandte Maskromolekulare Chemie, pp. 179-202, vol. 113, 1983
[Non-Patent Document 2] Journal of Polymer Sciences A: Polymer Chemistry, pp. 3603-3611, Vol. 35, 1997

DISCLOSURE OF THE INVENTION

Thus, since a sufficiently industrially advantageous method for producing a solution containing an unsaturated carboxylic acid-modified vinyl alcohol polymer (b) has yet to be found, there has been a strong desire for a method for efficiently producing a solution containing such a compound from inexpensive raw materials. An object of the present invention is to provide a method for efficiently producing a solution containing an unsaturated carboxylic acid-modified vinyl alcohol polymer (b) from inexpensive raw materials, and to provide a high gas barrier film obtained there from.

As a result of conducting extensive studies to achieve the above object, the inventors of the present invention found a sufficiently industrially advantageous method for producing a solution containing an unsaturated carboxylic acid-modified vinyl alcohol polymer (b) using as raw materials an industrially inexpensive and readily available unsaturated carboxylic acid (a), thereby leading to completion of the present invention.

Namely, in a first aspect thereof, the present invention is a method for producing a solution (A), (B) or (C) containing an unsaturated carboxylic acid-modified vinyl alcohol polymer (b) comprising following two steps of: (1) a reaction step in which an unsaturated carboxylic acid-modified vinyl alcohol polymer (b) is formed by reacting a vinyl alcohol polymer and an unsaturated carboxylic acid compound (a) in the presence of an acid catalyst soluble in a reaction system, and (2) an ion exchange step in which at least the acid catalyst among acidic compounds is removed with an anion exchange resin; and, a method for producing a solution (D) containing an unsaturated carboxylic acid-modified vinyl alcohol polymer (b) and an unsaturated carboxylic acid compound polyvalent metal salt (c) comprising (3) a neutralization step in which, subsequent to the reaction step and ion exchange step described above, an unsaturated carboxylic acid compound polyvalent metal salt (c) is formed by neutralizing the unsaturated carboxylic acid compound (a) in the solution (C) with a polyvalent metal compound. In a second aspect thereof, the present invention is a method for producing a solution (C) containing an unsaturated carboxylic acid-modified vinyl alcohol polymer (b) and an unsaturated carboxylic acid compound (a) comprising two steps consisting of (1) a reaction step in which an unsaturated carboxylic acid-denatured vinyl alcohol polymer (b) is formed by reacting a vinyl alcohol polymer and an unsaturated carboxylic acid compound (a) in the presence of a solid acid catalyst, and (2) a filtration step in which the solid acid catalyst is removed by filtration and the like; a method for producing a solution (B) containing an unsaturated carboxylic acid-modified vinyl alcohol polymer (b) comprising (3) an ion exchange step in which, subsequent to the reaction step and filtration step described above, the unsaturated carboxylic acid compound (a) is removed with an anion exchange resin; and a method for producing a solution (D) containing an unsaturated carboxylic acid-modified vinyl alcohol polymer (b) and an unsaturated carboxylic acid compound polyvalent metal salt (c) comprising (3) a neutralization step in which, subsequent to the reaction step and filtration step described above, an unsaturated carboxylic acid compound polyvalent metal salt (c) is formed by neutralizing the unsaturated carboxylic acid compound (a) in the solution (C) with a polyvalent metal compound. In a third aspect thereof, the present invention is a solution (A), (B), (C) or (D) containing at least an unsaturated carboxylic acid-modified vinyl alcohol polymer (b) obtained according to these production methods.

In addition, the present invention is a gas barrier film comprising the solution (A), (B) or (C) and a solution together with a solution comprised of an unsaturated carboxylic acid compound polyvalent metal salt (c), and a gas barrier film comprising a solution (D).

In addition, in the present invention, a gas barrier film obtained in this manner is such that the ratio $(A_0/A)$ of absorbance $A_0$, based on a value of 0 for the vC of carboxylic acid groups in the vicinity of $1700\ cm^{-1}$ in the infrared absorption spectrum thereof, to absorbance A, based on a value of 0 for the vC of carboxylate ions in the vicinity of $1520\ cm^{-1}$, is less than 0.25.

Moreover, the present invention is a gas barrier laminate comprising the formation of these gas barrier films on at least one side of a base material layer (I).

Moreover, the present invention is a method for producing a gas barrier film or gas barrier laminate comprising: coating a solution (D) containing an unsaturated carboxylic acid-modified vinyl alcohol polymer (b) and an unsaturated carboxylic acid compound polyvalent metal salt (c) onto at least one side of a base material or base material layer (I), followed by forming a polymer (X) of the unsaturated carboxylic acid compound polyvalent metal salt (c) containing the unsaturated carboxylic acid-modified vinyl alcohol polymer (b).

According to the present invention, a solution (A) or (B) containing an unsaturated carboxylic acid-modified vinyl alcohol polymer (b), a solution (C) containing an unsaturated carboxylic acid-modified vinyl alcohol polymer (b) and an unsaturated carboxylic acid compound (a), or a solution (D) containing an unsaturated carboxylic acid-modified vinyl alcohol polymer (b) and an unsaturated carboxylic acid compound polyvalent metal salt (c), can be industrially advantageously produced from inexpensive raw materials as compared with methods of the prior art.

BEST MODE FOR CARRYING OUT THE INVENTION

The following provides a detailed explanation of the present invention.
<Reaction Step>
Vinyl Alcohol Polymer
A vinyl alcohol copolymer that is a raw material of the method of the present invention is a polymer consisting mainly of vinyl alcohol, examples of which include polyvinyl alcohol and ethylene-vinyl alcohol copolymer. Although there are no particular limitations on the method for producing the vinyl alcohol polymer, it is typically obtained by carrying out (co)polymerization using vinyl acetate followed by saponifying the vinyl ester component of the vinyl acetate (co)polymer. Although a typical example of the vinyl ester used during production of vinyl alcohol polymer is vinyl acetate, other fatty acid vinyl esters such as vinyl propionate or vinyl pivalate can also be used. In addition, the degree of saponification of the vinyl ester component during production of vinyl alcohol polymer is normally 55% or more, preferably 70% or more and more preferably 90% or more.

Moreover, in the case the vinyl alcohol polymer is a copolymer, examples of monomers able to be copolymerized with vinyl ester include ethylene as well as α-olefins such as propylene, butene, isobutene, 4-methylentene-1, hexene or octene, unsaturated carboxylic acids such as itaconic acid, acrylic acid, methacrylic acid or maleic anhydride as well as salts, partial or complete esters, nitriles, other amides or acid anhydrides thereof, acrylamides such as acrylamide as well as N-monoalkylacrylamides or N,N-dialkylacrylamides thereof, vinyl silane compounds such as vinyltrimethoxysilane, unsaturated sulfonic acids such as 2-acrylamidopropane sulfonate as well as salts thereof, N-vinyl amides such as N-vinylpyrrolidone or N-vinylformamide, and vinyl halides such as vinyl chloride. The amount of monomer copolymerized with vinyl ester is normally 20 mol % or less and preferably 15 mol % or less based on the vinyl ester.

Although there are no particular limitations on the degree of polymerization of the vinyl alcohol polymer of the present invention, normally that having a mean degree of polymerization of 10 to 5000 is used.

Unsaturated Carboxylic Acid Compound (a)
An unsaturated carboxylic acid compound (a) serving as a raw material of the present invention refers to any compound having carbon-carbon double bonds and a carboxylic acid group within the same molecule, specific examples of which include α,β-unsaturated carboxylic acids such as acrylic acid, methacrylic acid, maleic acid, itaconic acid or cinnamic acid, and non-conjugated unsaturated carboxylic acids such as vinyl acetate, 3-hexenoic acid or 3-hexenoic diacid. Among these unsaturated carboxylic acid compounds (a), α, β-unsaturated carboxylic acids are used preferably, and the use of unsaturated carboxylic acid compounds having 10 or less carbons is preferable. Moreover, the use of acrylic acid or methacrylic acid is more preferable. The amount of the unsaturated carboxylic acid compound (a) used is such that the acidic group of the unsaturated carboxylic acid compound (a) is normally within the range of 0.01 to 100 moles, preferably within the range of 0.1 to 50 moles, and more preferably within the range of 1 to 20 moles, to 1 mole of the hydroxy group of the vinyl alcohol polymer raw material.

One type of these unsaturated carboxylic acid compounds (a) may be used alone or two or more types be used as a mixture.

Acid Catalyst Soluble in Reaction System
An acid catalyst soluble in the reaction system in the present invention refers to any Brønsted acid or Lewis acid that is soluble in the reaction system in the reaction step. Such acid catalysts may be an organic acid or inorganic acid, specific examples of which include inorganic acids such as hydrochloric acid, boric acid, nitric acid, sulfuric acid or phosphoric acid, organic carboxylic acids such as formic acid, acetic acid, propionic acid, chloroacetic acid, glycolic acid, benzoic acid or phthalic acid, organic sulfonic acids such as methylsulfonic acid, benzenesulfonic acid, p-toluenesulfonic acid or trifluoromethanesulfonic acid, and organic phosphoric acids such as diethyl phosphate or phenyl phosphate. Among these acid catalysts soluble in the reaction system, the use of inorganic acids and organic sulfonic acids is preferable, and the use of inorganic acids is more preferable. Among inorganic acids, the use of hydrochloric acid is more preferable. The amount of acid catalyst used that is soluble in the reaction system is normally within the range of 0.01 to 100 mol % and preferably within the range of 0.1 to 50 mol %, based on hydroxyl groups of the vinyl alcohol polymer raw material. One type of these acid catalysts may be used alone or two or more types may be used as a mixture.

Solid Acid Catalyst

A solid acid catalyst in the present invention refers to any Bronsted acid or Lewis acid that is insoluble in the reaction system in the reaction step. Such a solid acid catalyst may be an organic acid or an inorganic acid, specific examples of which include cation exchange resins such as a sulfonate ion exchange resin, complex oxides comprised of two or more types of metal oxides such as silica-magnesia, silica-alumina, silica-titania, titania-zirconia or alumina-boria, naturally-occurring clay minerals such as Fuller's earth, montmorillonite or kaolin, supported acids in which phosphoric acid or sulfuric acid and the like are supported on a support such as diatomaceous earth, silica gel, celite, alumina or zirconia, naturally-occurring or synthetic zeolites such as Y-type zeolite, mordenite or ZSM-5, and single-component metal oxides such as niobic acid, zinc oxide, alumina or titanium oxide. Among these solid acid catalysts, the use of a cation exchange resin is preferable. The amount of solid acid catalyst used is normally within the range of 0.01 to 500% by weight and preferably within the range of 0.1 to 200% by weight based on the vinyl alcohol polymer raw material. One type of these solid acid catalysts may be used alone or two or more types may be used as a mixture.

Solvent

Although the reaction step in the present invention can also be carried out in the absence of solvent, it is preferably carried out in the presence of a solvent. Specific examples of solvents in the case of using a solvent include water, alcohols such as methanol, ethanol or butanol, aliphatic or aromatic hydrocarbons such as n-hexane, n-pentane or cyclohexane, aliphatic or aromatic halides such as chloroform, chlorobenzene or dichlorobenzene, nitriles such as acetonitrile or benzonitrile, ethers such as diphenyl ether, anisole or 1,2-dimethoxyethane, ketones such as acetone or methyl isobutyl ketone, esters such as ethyl acetate or ethyl propionate, N-alkyl lactams such as 1-methyl-2-pyrrolidinone, N,N-dialkylamides such as N,N-dimethylformamide or N,N-dimethylacetoamide, sulfoxides such as dimethylsulfoxide, and sulfolanes such as sulfolane. Among these solvents, polar solvents such as water, alcohols, nitriles, ethers, ketones, esters, N-alkyl lactams, N,N-dialkylamides, sulfoxides and sulfolanes are preferable, and water is more preferable. The amount of solvent used is normally within the range of 0.1 to 500 parts by weight and preferably within the range of 1 to 200 parts by weight based on 1 part by weight of vinyl alcohol polymer. One type of these solvents may be used alone or two or more types may be used as a mixture.

Unsaturated Carboxylic Acid-Modified Vinyl Alcohol Polymer (b)

In the reaction step of the present invention, ester groups are formed by carrying out a condensation reaction between hydroxyl groups of the vinyl alcohol polymer raw material and carboxyl groups of the unsaturated carboxylic acid compound. Thus, unsaturated carboxylic acid modification in the present invention refers to the formation of ester groups by the condensation reaction described above. Namely, an unsaturated carboxylic acid-modified vinyl alcohol polymer (b) obtained according to the method of the present invention has a structure in which a portion of the hydroxyl groups of the vinyl alcohol polymer used are converted to unsaturated carboxyl groups originating in the unsaturated carboxylic acid compound. The modification rate of the unsaturated carboxylic acid-modified vinyl alcohol polymer (b) refers to the introduction rate of the unsaturated carboxylic acid compound in the unsaturated carboxylic acid-modified vinyl alcohol polymer (b), and is expressed as (number of moles of unsaturated carboxylic acid vinyl unit)/(number of moles of vinyl alcohol unit+number of moles of unsaturated carboxylic acid vinyl unit). Although the modification rate of the unsaturated carboxylic acid-modified vinyl alcohol polymer (b) can be suitably varied according to the purpose of use, it is normally within the range of 0.01 to 40 mol % and preferably within the range of 0.1 to 30 mol %.

Form of Reaction Step

Although the reaction step of the present invention can also be carried out in the absence of a polymerization inhibitor, it is preferably carried out in the presence of a polymerization inhibitor. Although a polymerization inhibitor is normally contained as a stabilizer in the unsaturated carboxylic acid compound (a), a polymerization inhibitor may be further added in the reaction step as necessary. There are no particular limitations on such a polymerization inhibitor provided it inhibits polymerization of carbon-carbon double bonds, examples of which include phenols such as hydroquinone or p-methoxyphenol, and amines such as phenothiazine. The amount of polymerization inhibitor added is normally within the range of 0.1 to 50000 ppm by weight, preferably within the range of 1 to 10000 ppm by weight, and more preferably within the range of 10 to 5000 ppm by weight based on the unsaturated carboxylic acid compound used in the reaction step.

The reaction temperature of the present invention is normally within the range of 0 to 200° C. and preferably within the range of 20 to 100° C. The reaction time is normally 100 hours or less and preferably within the range of 0.1 to 50 hours.

The reaction atmosphere during the reaction is such that the reaction can be carried out in an oxygen/inert gas mixed gas atmosphere or inert gas atmosphere. There are no particular limitations on the inert gas provided it is an inert gas in the reaction, examples of which include nitrogen, helium, neon, argon and xenon. The oxygen concentration in the oxygen/inert gas mixed gas when carrying out the reaction in an oxygen/inert gas mixed gas atmosphere is normally within the range of 0.01 to 25% and preferably within the range of 0.05 to 22%.

The pressure during the reaction is such that the reaction can be carried out at reduced pressure, at normal pressure or under pressure.

There are no particular limitations on the reaction method of the present invention, and the reaction method may be of a batch type, semi-batch type or continuous flow type.

Although the reaction solution obtained in the reaction step can be used directly in the ion exchange step or filtration step, it can also be used in the ion exchange step or filtration step after first diluting with a solvent as necessary. Specific examples of solvents in the case of diluting include the compound listed as examples of solvents in the case of using in the reaction step as well as the compounds listed as examples of unsaturated carboxylic acid compound (a). Among these solvents used in the case of diluting the reaction solution, polar solvents such as water, unsaturated carboxylic acid compounds, alcohols, nitriles, ethers, ketones, esters, N-alkyl lactams, N,N-dialkylamides, sulfoxides and sulfolanes are preferable, while water or unsaturated carboxylic acid compounds are more preferable. In addition, the solvent used in the case of diluting the reaction solution is preferably of the same type as the solvent or unsaturated carboxylic acid compound used in the reaction step. The amount of solvent used in the case of diluting the reaction solution is normally within the range of 0.01 to 5000 parts by weight and preferably within the range of 0.1 to 1000 parts by weight to 1 part by weight of the vinyl alcohol polymer. One type of solvent may be used alone or two or more types may be used as a mixed solvent.

<Filtration Step>

In the present invention, the solid acid catalyst is removed by an ordinary solid-liquid separation method such as filtration or centrifugal separation following completion of the reaction step in the case of having used a solid acid catalyst. Thus, the filtration step in the present invention refers to the removal of solid acid catalyst by an ordinary solid-liquid separation method described above.

Form of Filtration Step

In the filtration step of the present invention, the temperature during removal of the solid acid catalyst is within the range of 0 to 100° C. and preferably within the range of 10 to 80° C.

The time required during removal of the solid acid catalyst is normally 100 hours or less and preferably 50 hours or less.

In the neutralization step of the present invention, the pressure at which the solid acid catalyst is removed may be reduced pressure, normal pressure or under pressure.

There are no particular limitations on method of the neutralization step of the present invention, and the method may be of a batch type, semi-batch type or continuous flow type.

In the filtration step of the present invention, in the case of removing the solid acid catalyst by filtration, a filtration assistant such as celite, activated charcoal or glass wool can be used as necessary.

The solution obtained from the filtration step of the present invention is the solution (B) containing unsaturated carboxylic acid-modified vinyl alcohol polymer.

<Ion Exchange Step>

In the present invention, the unsaturated carboxylic acid compound (a) in the filtrate obtained in the filtration step in the case of having used at least an acid catalyst or solid acid catalyst of an acidic compound present in the reaction solution obtained in the reaction step in the case of having used an acid catalyst soluble in the reaction system is removed using an anion exchange resin. An acidic compound in the ion exchange step of the present invention refers to the acid catalyst soluble in the reaction system or unsaturated carboxylic acid compound used in the reaction step.

Anion Exchange Resin

The anion exchange resin used in the present invention refers to a compound listed as an example of an acid catalyst soluble in the reaction system or a compound listed as an example of the unsaturated carboxylic acid compound (a), there are no limitations thereon provided it is able to remove, for example, carbonate ions, chloride ions, sulfate ions or sulfonate ions, may be a strongly basic anion exchange resin or weakly basic anion exchange resin, and may be of a gel type or porous type. In addition, an OH type is used in the case of an ion type of anion exchange resin used when removing an acidic compound in the ion exchange step. The amount of anion exchange resin used is such that the volumetric capacity is within the range of 0.01 to 100 L and preferably within the range of 0.1 to 50 L based 1 mole of the acidic compound to be removed. One type of these anion exchange resins may be used or two or more types may be used as a mixture.

Form of Ion Exchange Step

Although a solution to be treated in the ion exchange step can be used as is in the ion exchange step, it may also be used in the ion exchange step after subjecting to pretreatment such as filtering out insoluble catalyst components and the like as necessary.

In the ion exchange step in the case of having used an acid catalyst soluble in the reaction system, at least the acid catalyst of the acidic compounds is removed by the anion exchange resin. Examples of acidic compounds removed include the case of removing both unsaturated carboxylic acid compound (a) and acid catalyst and the case of removing acid catalyst only.

In the case of removing the acid catalyst only with the anion exchange resin, a portion of the unsaturated carboxylic acid compound (a) may also be simultaneously removed. When removing an acidic compound in the ion exchange step, it is not necessary to completely remove the acid catalyst, and the amount of anion originating in the acid catalyst in the form of, for example, chloride ions, sulfate ions or sulfonate ions, remaining in solution (A), (B) or (C) is normally 5000 ppm by weight or less, preferably 500 ppm by weight or less and more preferably 100 ppm by weight or less.

In the ion exchange step in the case of having used a solid acid catalyst in the reaction system, the unsaturated carboxylic acid compound (a) is removed by the anion exchange resin. When removing the unsaturated carboxylic acid compound (a) in the ion exchange step, it is not necessary to completely remove the unsaturated carboxylic acid compound (a), and the amount of anion originating in the unsaturated carboxylic acid compound in the form of for example, acrylate ions, methacrylate ions or maleate ions, remaining in solution (B) is normally 15% by weight or less, preferably 10% by weight or less and more preferably 5% by weight or less.

In the ion exchange step of the present invention, the temperature during removal of acidic compounds with the anion exchange resin is normally within the range of 0 to 150° C. and preferably within the range of 10 to 100° C. The treatment time during removal of acidic compounds with the anion exchange resin is normally 100 hours or less and preferably 50 hours or less.

The pressure during removal of acidic compounds with the anion exchange resin is such that removal is carried out at normal pressure or under pressure.

In the ion exchange step of the present invention, there are no particular limitations on the method used during removal of acidic compounds with the anion exchange resin, and although removal may be carried out using a batch method or continuous flow method, a continuous flow method is preferable.

The solution obtained from the ion exchange step in the case of having used an acid catalyst soluble in the reaction system is the solution (A) containing the unsaturated carboxylic acid-modified vinyl alcohol polymer (b) of the present invention. The solution obtained during removal of both acid catalyst and the unsaturated carboxylic acid compound (a) in the ion exchange step in the case of having used an acid catalyst soluble in the reaction system, or the solution obtained during removal of only the unsaturated carboxylic acid compound (a) in the ion exchange step in the case of having used a solid acid catalyst, is the solution (B) containing the unsaturated carboxylic acid-modified vinyl alcohol polymer (b). In addition, the solution obtained during removal of acid catalyst in the ion exchange step in the case of having used an acid catalyst soluble in the reaction system is the solution (C) containing the unsaturated carboxylic acid-modified vinyl alcohol polymer (b) and the unsaturated carboxylic acid compound (a).

<Neutralization Step>

In the present invention, an unsaturated carboxylic acid compound polyvalent metal salt (c) may be obtained by neutralizing the unsaturated carboxylic acid compound (a) in the solution (C) with a polyvalent metal compound.

Polyvalent Metal Compound

There are no particular limitations on the polyvalent metal compound used in the present invention provided it contains polyvalent metal atoms. Polyvalent metal atoms refer to metal atoms belonging to groups 2 to 13 of the periodic table or metal atoms belonging to periods 5 and 6 of group 14, examples of which include metal atoms belonging to group 2 such as Mg, Ca, Sr or Ba, metal atoms belonging to group 3 such as Sc or Y, metal atoms belonging to group 4 such as Ti, Zr or Hf, metal atoms belonging to group 5 such as V, metal atoms belonging to group 6 such as Cr, Mo or W, metal atoms belonging to group 7 such as Mn, metal atoms belonging to group 8 such as Fe or Ru, metal atoms belonging to group 9 such as Co or Rh, metal atoms belonging to group 10 such as Ni, Pd or Pt, metal atoms belonging to group 11 such as Cu or Ag, metal atoms belonging to group 12 such as Zn, Cd or Hg, metal atoms belonging to group 13 such as Al or Ga, Sn, which is a metal atom belonging to period 5 of group 14, and Pb, which is a metal atom belonging to period 6 of group 14. Among these, the polyvalent metal atoms of Mg, Ca, Zn, Ba, Al or Ti are preferable, and the polyvalent metal atom of Zn is more preferable. More specifically, a compound containing a polyvalent metal atom in the form of polyvalent metal atoms refers to, for example, a metal such as magnesium, calcium, zinc or aluminum, examples of which include oxides such as magnesium oxide, calcium oxide or zinc oxide, hydroxides such as magnesium hydroxide, calcium hydroxide or zinc hydroxide, halides such as magnesium chloride, calcium chloride or zinc chloride, alkoxides such as calcium dimethoxide, zinc dimethoxide or aluminum trimethoxide, carboxylates such as calcium acetate, zinc acetate or tin acetate, carbonates such as magnesium carbonate, calcium carbonate or zinc carbonate, phosphates such as magnesium phosphate or calcium phosphate, phosphites such as magnesium phosphite or calcium phosphite, hypophosphites such as magnesium hypophosphite or calcium hypophosphite, sulfates such as magnesium sulfate, calcium sulfate or zinc sulfate, and sulfites such as magnesium sulfite or calcium sulfite. Among these, oxides, hydroxides, alkoxides, carboxylates and carbonates are used preferably, while oxides, hydroxides and carbonates are used more preferably. The amount of polyvalent metal compound used in the neutralization step is such that the amount of polyvalent metal atoms of the polyvalent metal compound used is normally within the range of 0.1 to 10 moles, and preferably within the range of 0.2 to 5 moles, to 1 mole of acidic groups of the unsaturated carboxylic acid compound (a) contained in the solution (C). One type of these polyvalent metal compounds may be used alone or two or more types may be used as a mixture.

Form of Neutralization Step

In the neutralization step of the present invention, the temperature when neutralizing the unsaturated carboxylic acid compound (a) with a polyvalent metal compound is normally within the range of 0 to 100° C. and preferably within the range of 10 to 80° C. The treatment time when neutralizing the unsaturated carboxylic acid compound (a) with a polyvalent metal compound is normally 100 hours or less and preferably within the range of 0.1 to 50 hours.

In the neutralization step of the present invention, the pressure when neutralizing the unsaturated carboxylic acid compound (a) with a polyvalent metal compound is such that neutralization can be carried out under reduced pressure, at normal pressure or under pressure.

There are no particular limitations on the method used to carry out the neutralization reaction of the present invention, and the reaction may be carried out with a batch method or a continuous flow method.

Following completion of the neutralization step, unreacted solid polyvalent metal compound can be removed by an ordinary solid-liquid separation method such as filtration or centrifugal separation depending on the case. At that time, a filtration assistant such as celite, activated charcoal or glass wool can be added as necessary.

The solution obtained from the neutralization step of the present invention is the solution (D) containing the unsaturated carboxylic acid-modified vinyl alcohol polymer (b) and the unsaturated carboxylic acid compound polyvalent metal salt (c).

A gas barrier film can be produced from these solutions (A), (B) or (C) along with a solution comprised of the unsaturated carboxylic acid compound polyvalent metal salt (c). In addition, a gas barrier film can be produced from the solution (D) directly.

In this case, a solution is preferably used in which the content of the unsaturated carboxylic acid-modified vinyl alcohol polymer (b) in the solution is 50% by weight or less and the content of the unsaturated carboxylic acid compound polyvalent metal salt (c) is 50% by weight or more.

The resulting gas barrier film is a film having superior gas barrier properties in which the ratio ($A_0/A$) of absorbance $A_0$, based on a value of 0 for the vC of carboxylic acid groups in the vicinity of 1700 $cm^{-1}$ in the infrared absorption spectrum thereof, to absorbance A, based on a value of 0 for the vC of carboxylate ions in the vicinity of 1520 $cm^{-1}$, is less than 0.25.

The polyvalent metal of the unsaturated carboxylic acid compound polyvalent metal salt used is preferably at least one type selected from the group consisting of Mg, Ca, Zn, Ba and Al.

Moreover, the present invention is a gas barrier laminate in which a gas barrier film is formed on at least one side of the base material layer (I).

Gas Barrier Film

The gas barrier film of the present invention is produced from the previously described solution (A), (B) or (C), comprised of the unsaturated carboxylic acid-modified vinyl alcohol polymer (b) along with the unsaturated carboxylic acid compound polyvalent metal salt (c), or the solution (D). In addition, the gas barrier film is produced from the previously described solution (D).

At that time, the ratio of the unsaturated carboxylic acid-modified vinyl alcohol polymer (b) in the solution (A), (B) or (C) and the unsaturated carboxylic acid compound polyvalent metal salt (c) is such that the amount of the unsaturated carboxylic acid-modified vinyl alcohol polymer (b) in the solution (A), (B) or (C) is preferably 50% by weight or less, more preferably within the range of 40 to 0.001% by weight and particularly preferably within the range of 30 to 0.01% by weight, and the amount of the unsaturated carboxylic acid compound polyvalent metal salt (c) is preferably in excess of 50% by weight, more preferably in excess of 60% by weight, and particularly preferably within the range of 70 to 99.9% by weight (the combined amount of both is 100% by weight)

In addition, in the case of using the solution (D), the ratio of the unsaturated carboxylic acid-modified vinyl alcohol polymer (b) and the unsaturated carboxylic acid compound polyvalent metal salt (c) is such that the ratio is preferably controlled in advance when preparing the solution (D) so as to be within a range described above. In addition, the ratio is preferably adjusted to the above ratio by additionally incorporating the unsaturated carboxylic acid compound polyvalent metal salt (c) to the solution (D)) as necessary.

The gas barrier film of the present invention is such that the ratio ($A_0/A$) of absorbance $A_0$, based on a value of 0 for the vC of carboxylic acid groups in the vicinity of 1700 cm$^{-1}$ in the infrared absorption spectrum thereof, to absorbance A, based on a value of 0 for the vC of carboxylate ions in the vicinity of 1520 cm-$^1$, is preferably less than 0.25, more preferably less than 0.20 and even more preferably less than 0.15.

The gas barrier film of the present invention has improved gas barrier properties at low humidity as a result of containing the unsaturated carboxylic acid-modified vinyl alcohol polymer (b), and imparts toughness (elongation) to the film without causing a decrease in gas barrier properties following hot water treatment (hot water resistance). In the case the content of the unsaturated carboxylic acid-modified vinyl alcohol polymer (b) exceeds 50% by weight, there is the risk of a decrease in gas barrier properties of the resulting film, and particularly a partial decrease in gas barrier properties at high humidity (oxygen barrier properties). On the other hand, if the content of the unsaturated carboxylic acid-modified vinyl alcohol polymer (b) is excessively low, effects of improving gas barrier properties at low humidity may be inadequate.

In the gas barrier film of the present invention, carboxylate ions and free carboxylic acid groups respectively formed by ionic crosslinking between carboxylic acid groups of the unsaturated carboxylic acid compound polyvalent metal salt (c) and polyvalent metal are present in the gas barrier film of the present invention, and the absorbance based on a value of 0 for the vC of the free carboxylic acid groups is in the vicinity of 1700 cm$^{-1}$ in the infrared absorption spectrum thereof, while the absorbance based on a value of 0 for the vC of the carboxylate ions is in the vicinity of 1520 cm$^{-1}$, respectively.

In a gas barrier film as claimed in the present invention, the fact that the ratio of ($A_0/A$) is less than 0.25 indicates that free carboxylic acid groups are either not present or only present in a small amount, and since a layer in which this ratio exceeds 0.25 has the risk of not improving the gas barrier properties at high humidity due to a high content of free carboxylic acid groups, the ratio of ($A_0/A$) is preferably less than 0.25.

The ratio ($A_0/A$) of absorbance $A_0$, based on a value of 0 for the vC of carboxylic acid groups in the vicinity of 1700 cm$^{-1}$, to absorbance A, based on a value of 0 for the vC of carboxylate ions in the vicinity of 1520 cm$^{-1}$ in the infrared absorption spectrum thereof, was obtained by cutting out a measurement sample measuring 1 cm×3 cm from the gas barrier film and measuring the infrared attenuated total reflection (ATR) of the infrared absorption spectrum of the surface thereof (polymer (A) layer), and absorbance $A_0$ and absorbance A were first determined according to the procedure described below.

Absorbance $A_0$ based on a value of 0 for the vC of carboxylic acid groups in the vicinity of 1700 cm$^-$: Absorbance values of the infrared absorption spectrum at 1660 cm$^{-1}$ and 1760 cm$^{-1}$ were connected with a line (N), a line (O) was dropped down from the maximum absorbance (vicinity of 1700 cm$^{-1}$) from 1660 cm$^{-1}$ to 1760 cm$^{-1}$, and the absorbance distance (length) between the intersection of lines (O) and (N) and the maximum absorbance was taken to be absorbance $A_0$.

Absorbance A based on a value of 0 for the vC of carboxylate ions in the vicinity of 1520 cm$^{-1}$: Absorbance values of the infrared absorption spectrum at 1480 cm$^{-1}$ and 1630 cm$^{-1}$ were connected with a line (L), a line (M) was dropped down from the maximum absorbance (vicinity of 1520 cm$^{-1}$) from 1480 cm$^{-1}$ to 1630 cm$^{-1}$, and the absorbance distance (length) between the intersection of lines (M) and (L) and the maximum absorbance was taken to be absorbance A. Furthermore, the location of the peak indicating maximum absorbance (vicinity of 1520 cm$^{-1}$) changes according to the counter ion metal species used, and for example, is in the vicinity of 1520 cm$^{-1}$ in the case of calcium, in the vicinity of 1520 cm$^{-1}$ in the case of zinc, and in the vicinity of 1540 cm$^{-1}$ in the case of magnesium.

Next, the ratio of ($A_0/A$) of absorbance $A_0$ to absorbance A, which were determined according to the method described above, was determined.

Furthermore, measurement of infrared spectra (measurement of attenuated total reflection (ATR)) in the present invention was carried out by using the FT-IR350 system manufactured by Jasco Corp. and installing a KRS-5 (thallium bromide-iodide) crystal under conditions consisting of an incident angle of 45 degrees, room temperature, resolution of 4 cm$^{-1}$ and 150 integration cycles.

Although the thickness of the gas barrier film of the present invention can be variously determined according to the application, it is normally within the range of 0.0 to 100 μm, preferably within the range of 0.05 to 50 μm and more preferably within the range of 0.1 to 10 μm.

The gas barrier film of the present invention may contain, within a range that does not impair the object of the present invention, and in addition to the unsaturated carboxylic acid-modified vinyl alcohol polymer (b), a natural water-soluble polymer such as starch, gum arabic, gelatin or polysaccharide, a cellulose derivative such as methyl cellulose, ethyl cellulose or carboxymethyl cellulose, a semi-synthetic water-soluble polymer such as modified starch, a vinyl alcohol polymer such as polyvinyl alcohol or ethylene-vinyl alcohol copolymer, a synthetic water-soluble acrylic acid esterpolymer such as polyvinyl pyrrolidone, polyvinyl ethyl ether, polyacrylamide or polyethyleneimine, or other high molecular weight compound (polymer), ethylene-acrylic acid copolymer, polyvinyl acetate, ethylene-vinyl acetate copolymer, polyester or polyurethane.

In addition, the gas barrier film of the present invention may also contain, within a range that does not impair the object of the present invention, various types of additives such as lubricants, slipping agents, anti-blocking agents, antistatic agents, anti-clouding agents, pigments, dyes or inorganic or organic fillers, examples of which include polyvalent unsaturated carboxylic acid esters such as ethylene glycol diacrylate, diethylene glycol diacrylate, triethylene glycol diacrylate, PEG#200 diacrylate, PEG#400 diacrylate or PEG#600 diacrylate, unsaturated carboxylic acid compound monovalent metal salts, acrylic acid ester compounds such as methyl (meth) acrylate or ethyl (meth)acrylate, vinyl ester compounds such as vinyl acetate, and olefin compounds such as ethylene, or various types of surfactants may be contained to improve wettability or adhesion and the like with the base material to be described later.

Consequently, other components as described above are incorporated into the solutions (A), (B) or (C) and solution (D) prepared as previously described as necessary.

Gas Barrier Laminate

The gas barrier laminate of the present invention is produced by forming a gas barrier film on at least one side of the base material layer (I) from the previously described solution (A), (B) or (C) in the form of a solution comprised of the unsaturated carboxylic acid-modified vinyl alcohol polymer (b) and the unsaturated carboxylic acid compound polyvalent metal salt (c). In addition, the gas barrier laminate of the present invention is produced by forming a gas barrier film formed from the solution (D) on at least one side of the base material layer (I).

The formation (lamination) of the gas barrier film results in a laminate having transparency, superior gas barrier properties (oxygen barrier properties) at both high humidity and low humidity, and toughness without causing a decrease in gas barrier properties (hot water resistance) following hot water treatment.

In addition, in the case of using a gas barrier laminate using a film base material (I-1) for the base material layer (I) in a packaging material and the like, heat seal strength is improved.

Another aspect of the gas barrier laminate of the present invention has, as a base material layer (I) to be described later, a base material layer in which an inorganic compound deposited layer (II) to be described later is formed on at least one side of the base material layer (I). This laminate has the gas barrier film described above formed on at least one side of the inorganic compound deposited layer (II). As a result of using a base material layer in which the inorganic compound deposited layer (II) is formed for the base material layer, a gas barrier laminate can be obtained that is imparted with humidity resistance.

Another aspect of the gas barrier laminate of the present invention is a gas barrier laminate in which the inorganic compound deposited layer (II) to be described later is formed on at least one side of a gas barrier film that forms the gas barrier laminate. As a result of forming the inorganic compound deposited layer (II) on a gas barrier film, a gas barrier laminate can be obtained that is imparted with humidity resistance.

In addition, when laminating the gas barrier film to the base material layer (I), several layers of the gas barrier film and inorganic compound deposited layer (II) may be laminated in the manner of, for example, base material (I)/gas barrier film/inorganic compound deposited layer (II)/gas barrier film/inorganic compound deposited layer (II)/gas barrier film.

A gas barrier laminate laminated with multiple layers in this manner is able to nearly completely block out oxygen or other gases and water vapor.

The gas barrier laminate of the present invention can also be a laminate having a known shape, such as a laminated film (sheet), hollow container, cup or tray, according to the shape of the base material layer (I) to be described later or corresponding to the application.

Although the thickness of the gas barrier laminate of the present invention can variously determined according to the application, and the thickness of the base material layer (I) is normally 5 to 1500 μm, preferably 5 to 500 μm, more preferably 9 to 100 μm and even more preferably 9 to 30 μm, and in the case having the inorganic compound deposited layer (II), the thickness of the deposited layer (II) is normally 15 to 5000 Å, preferably 15 to 2000 Å and more preferably 20 to 1500 Å, the thickness of the gas barrier film comprised of the polymer (X) layer is normally 0.01 to 100 μm, preferably 0.05 to 50 μm and more preferably 0.1 to 10 μm, and the total thickness of the gas barrier laminate is normally 5 to 1600 μm, preferably 5 to 550 μm, more preferably 10 to 150 μm, and even more preferably 10 to 40 μm.

Base Material Layer (I)

The base material layer (I) that forms the gas barrier laminate of the present invention is normally comprised of a film-like material such as a sheet or film comprised of a heat-curing resin or thermoplastic resin, that having the shape of a container such as a tray, cup or hollow body, a film-like material such as paper or aluminum foil, or a composite thereof. The base material layer (I) may be a single layer or a multilayer body of, for example, identical or different resins.

Examples of heat-curing resins include various known heat-curing resins such as epoxy resin, unsaturated polyester resin, phenol resin, urea-melamine resin, polyurethane resin, silicone resin or polyimide.

Examples of thermoplastic resins include various known thermoplastic resins such as polyolefins (including polyethylene, polypropylene, poly4-methyl-1-pentene and polybutene), polyesters (including polyethylene terephthalate, polybutylene terephthalate and polyethylene naphthalate), polyamides (including Nylon-6, Nylon-66 and polymetaxylene adipamide), polyvinyl chloride, polyimides, ethylene-vinyl acetate copolymers and saponification products thereof, polyvinyl alcohol, polyacrylonitrile, polycarbonate, polystyrene, ionomers or mixtures thereof. Among these, thermoplastic resins such as polypropylene, polyethylene terephthalate or polyamide are preferable due to their satisfactory stretchability and transparency.

In addition, in the case of using the film base material (I-1) for the base material layer (I), the film base material may be a uniaxially or biaxially stretched film base material. If a biaxially stretched film base material is used for the film base material (I-1), a laminate is obtained having superior transparency, heat resistance and stiffness.

In addition, the inorganic compound deposited layer (II) may also be formed on the surface of the base material layer (I).

Although there are no particular limitations on the inorganic compound deposited on the surface of the base material layer (I) or the surface of a gas barrier film provided it is an inorganic compound that can be deposited thereon, specific examples include metals such as chromium (Cr), zinc (Zn), cobalt (Co), aluminum (Al), tin (Sn) and silicon (Si) as well as oxides, nitrides, sulfates and phosphates thereof. Among these inorganic compounds, oxides, and particularly oxides such as aluminum oxide, zinc oxide and silica (silicon oxide) are preferable due to their superior transparency.

Examples of methods for forming the inorganic compound deposited layer (II) on the surface of the base material layer (I) or gas barrier film include chemical deposition methods such as chemical vapor deposition (CVD), low-pressure CVD or plasma CVD, vacuum deposition methods (reactive vacuum deposition), physical vapor deposition (PVD) methods such as sputtering (reactive sputtering) or ion plating (reactive ion plating), and plasma spraying methods such as low-pressure plasma spraying and plasma spraying.

In addition, polyvinylidene chloride, polyvinyl alcohol, ethylene-vinyl alcohol copolymer, acrylic resin or urethane resin and the like may be coated on the surface of the base material layer (I).

The base material layer (I) may be subjected to surface activation treatment such as corona treatment, flame treatment, plasma treatment, undercoating treatment or primer coating treatment to improve adhesion to the gas barrier film.

A gas barrier film or gas barrier laminate can be produced by coating the solution (D) containing the previously described unsaturated carboxylic acid-modified vinyl alcohol polymer (b) and unsaturated carboxylic acid compound polyvalent metal salt (c) onto at least one side of a base material or the base material layer (I) followed by causing the solution to form a polymer.

Gas Barrier Film and Gas Barrier Laminate Production Method

The production method of the gas barrier film and gas barrier laminate of the present invention (to also be referred to as the production method of a gas barrier film and the like) consists of a method for producing a gas barrier film or gas barrier laminate by forming a gas barrier film from a solution comprised of the described below solution (A), (B) or (C) in the form of the unsaturated carboxylic acid-modified vinyl alcohol polymer (b) along with the unsaturated carboxylic acid compound polyvalent metal salt (c), and a method for producing a gas barrier film or a gas barrier laminate by forming a gas barrier film from the solution (D) on at least one side of the base material or the base material layer (I).

In particular, if solution (D) is used, containing the described below unsaturated carboxylic acid-modified vinyl alcohol polymer (b) and the unsaturated carboxylic acid compound polyvalent metal salt (c), it is not necessary to preliminarily mix and prepare the unsaturated carboxylic acid-modified vinyl alcohol polymer (b) and the unsaturated carboxylic acid compound polyvalent metal salt (c) to produce a gas barrier film. Furthermore, depending on the case, although the unsaturated carboxylic acid compound polyvalent metal salt (c) is additionally incorporated in the solution (D) to adjust concentration as necessary, doing so facilitates the procedure as compared with mixing it in from the start.

At that time, the ratio of the unsaturated carboxylic acid-modified vinyl alcohol polymer (b) in solution (A), (B) or (C) and the unsaturated carboxylic acid compound polyvalent metal salt (c) is such that the amount of the unsaturated carboxylic acid-modified vinyl alcohol polymer (b) in solution (A), (B) or (C) is preferably 50% by weight or less, more preferably within the range of 40 to 0.001% by weight, and particularly preferably within the range of 30 to 0.01% by weight, while the amount of the unsaturated carboxylic acid compound polyvalent metal salt (c) is preferably in excess of 50% by weight, more preferably in excess of 60% by weight, and particularly preferably within the range of 70 to 99.9% by weight (the combined amount of both is 100% by weight).

In addition, in the case of using solution (D), the ratio of the unsaturated carboxylic acid-modified vinyl alcohol monomer (b) and the unsaturated carboxylic acid compound polyvalent metal salt (c) in solution (D) is preferably controlled when preparing the solution (D) so as to be within the range described above. In addition, the ratio is preferably adjusted to be within the above range by additionally incorporating the unsaturated carboxylic acid compound polyvalent metal salt (c) in the solution (D) as necessary.

In the production method of a gas barrier film and the like of the present invention, if the base material layer (I) is used for the base material, a gas barrier laminated is obtained in which the gas barrier film is laminated onto at least one side of the present invention. In addition, a single-layer gas barrier film of the present invention is obtained if the base material layer (I) or an inorganic material such as glass, ceramic or metal or other material is used for the base material, and the polymer (X), obtained by polymerizing the unsaturated carboxylic acid compound polyvalent metal salt (c) and the like, is separated from the base material.

An example of a method for forming a gas barrier film on at least one side of the base material layer (I) and the like consists of dissolving desired amounts of the unsaturated carboxylic acid-modified vinyl alcohol polymer (b) in the solution (A), (B) or (C) along with the unsaturated carboxylic acid compound polyvalent metal salt (C) in a solvent such as water, followed by coating a solution in which the previously described other high molecular weight compounds and various types of additives are incorporated in the mixture as necessary. Moreover, another example consists of coating a solution in which the other high molecular weight compounds and various types of additives are incorporated as necessary in solution (D).

In addition, various known coating methods can be employed for coating the solution onto at least one side of the base material layer (I) and the like according to the shape of the base material layer (I) and the like, such as coating the solution onto the base material layer (I) with a brush or coater, immersing the base material layer (I) in the solution, and spraying the solution onto the surface of the base material layer (I).

Although examples of solvents used in the solution include organic solvents such as water, lower alcohols such as methyl alcohol, ethyl alcohol or isopropyl alcohol and organic solvents such as acetone and methyl ethyl ketone, as well as mixed solvents thereof, water is most preferable.

Examples of methods for coating a solution of the unsaturated carboxylic acid compound polyvalent metal salt (c) containing the unsaturated carboxylic acid-modified vinyl alcohol polymer (b) into at least one side of the base material layer (I) and the like include immersing the base material layer (I) in the solution and spraying the solution onto the surface of the base material layer (I), as well as coating by using various types of known coating machines such as gravure coaters such as an air knife coater, direct gravure coater, gravure offset coater, arc gravure coater, gravure reverse coater or jet nozzle gravure coater, reverse roll coaters such as a top feed reverse coater, bottom feed reverse coater or nozzle feed reverse coater, 5-roll coaters, lip coaters, bar coaters, bar reverse coaters and die coaters.

When dissolving the unsaturated carboxylic acid compound polyvalent metal salt (c) and/or unsaturated carboxylic acid-modified vinyl alcohol polymer (b), or when dissolving an unsaturated carboxylic acid compound and polyvalent metal compound, polyvalent unsaturated carboxylic acid esters such as ethylene glycol diacrylate, diethylene glycol diacrylate, triethylene glycol diacrylate, PEG#200 diacrylate, PEG#400 diacrylate or PEG#600 diacrylate, unsaturated carboxylic acid compound monovalent metal salts, acrylic acid ester compounds such as methyl (meth)acrylate or ethyl (meth)acrylate, vinyl ester compounds such as vinyl acetate, and monomers or low molecular weight compound such as olefin compounds such as ethylene, or starch or high molecular weight compounds such as a natural water-soluble polymer such as gum arabic, gelatin or polysaccharide, a cellulose derivative such as methyl cellulose, ethyl cellulose or carboxymethyl cellulose, a semi-synthetic water-soluble polymer such as modified starch, a vinyl alcohol polymer such as polyvinyl alcohol or ethylene-vinyl alcohol copolymer, a synthetic water-soluble acrylic acid ester polymer such as polyvinyl pyrrolidone, polyvinyl ethyl ether, polyacrylamide or polyethyleneimine, or other high molecular weight compounds such as, ethylene-acrylic acid copolymer, polyvinyl acetate, ethylene-vinyl acetate copolymer, polyester or polyurethane, may be added within a range that does not impair the object of the present invention as previously described.

In addition, when dissolving the unsaturated carboxylic acid compound polyvalent metal salt (c) and/or the unsaturated carboxylic acid-modified vinyl alcohol polymer (b), various types of additives such as lubricants, slipping agents, anti-blocking agents, antistatic agents, anti-clouding agents, pigments, dyes or inorganic or organic fillers may be added within a range that does not impair the object of the present invention, or various types of surfactants may be added to improve wettability with the base material layer.

Various known methods, specific examples of which include methods using ionizing radiation or heat, are used to polymerize the solution of the unsaturated carboxylic acid-modified vinyl alcohol polymer (b) and the unsaturated carboxylic acid compound polyvalent metal salt (c) formed (coated) on at least one side of the base material layer (I) and the like.

In the case of using ionizing radiation, there are no particular limitations thereon provided it is an energy ray having a wavelength region within the range of 0.0001 to 800 nm, and examples of such energy rays include α rays, β rays, γ rays, visible light, ultraviolet light and an electron beam. Among these forms of ionizing radiation, visible light having a wavelength region within the range of 400 to 800 nm, ultraviolet light having a wavelength region within the range of 50 to 400 nm and an electron beam having a wavelength region within the range of 0.01 to 0.002 nm are preferable due their handling ease and wide range of applicable devices.

In the case of using visible light or ultraviolet light for the ionizing radiation, it is necessary to add a photopolymerization initiator to the solution of the unsaturated carboxylic acid compound polyvalent metal salt (c) containing the unsaturated carboxylic acid-modified vinyl alcohol polymer (b). A known photopolymerization initiator can be used for the photopolymerization initiator, examples of which include radical polymerization initiators manufactured and sold under trade names such as 2-hydroxy-2-methyl-1-phenyl-propan-1-one (Ciba Specialty Chemicals, trade name: Darocure 1173), 1-hydroxy-cyclohexyl-phenyl ketone (Ciba Specialty Chemicals, trade name: Irgacure 184), bis(2,4,6-trimethyl-benzoyl)-phenylphosphine oxide (Ciba Specialty Chemicals, trade name: Irgacure 819), 1-[4-(2-hydroxyethoxy)-phenyl]-2-hydroxy-2-methyl-1-propan-1-one (Ciba Specialty Chemicals, trade name: Irgacure 2959), mixture of α-hydroxyketone, acylphosphine oxide, 4-methylbenzophenone and 2,4,6-trimethylbenzophenone (Lamberti Specialty Chemicals, trade name: Esacure KT046), Esacure KT55 (Lamberti Specialty Chemicals), and 2,4,6-trimethylbenzoyl diphenylphosphine oxide (Lambson Fine Chemicals, trade name: Speedcure TPO) . Moreover, a polymerization accelerator can be added to improve the degree of polymerization or polymerization rate, examples of which include N,N-dimethylamino-ethyl-(meth)acrylate and N-(meth)acryloyl-morpholine.

When polymerizing the unsaturated carboxylic acid compound polyvalent metal salt (c) containing the unsaturated carboxylic acid-modified vinyl alcohol polymer (b), although the solution may be polymerized in the state of containing a solvent such as water or may be polymerized after partially drying, in the case of polymerizing immediately after coating the solution, there are cases in which the resulting polymer (X) layer whitens perhaps due to excessive evaporation of solvent during polymerization of the unsaturated carboxylic acid compound polyvalent metal salt (c). On the other hand, there also cases in which the unsaturated carboxylic acid compound polyvalent metal salt (c) precipitates in the form of crystals as the solvent (moisture) decreases, and formation of the resulting polymer layer becomes inadequate if polymerized while in this state, thereby resulting in the risk of whitening of the polymer (X) layer or gas barrier properties being unstable. Thus, when polymerizing the coated unsaturated carboxylic acid compound polyvalent metal salt (c) , polymerization is preferably carried out in a state in which it contains a suitable amount of moisture.

In addition, when polymerizing the unsaturated carboxylic acid compound polyvalent metal salt (c) containing the unsaturated carboxylic acid-modified vinyl alcohol polymer (b), polymerization may be carried out by irradiating with ionizing radiation once or polymerization may be carried out by dividing irradiation into two or more doses or by irradiating continuously. In addition, in the case of irradiating in two or more doses, the first dose may be weak while the second dose may be strong, or the radiation intensity may be the same for all doses or changed continuously.

In addition, the resulting polymer is further subjected to heat treatment. Heat treatment is normally carried out within the range of 30 to 350° C., preferably within the range of 50 to 300° C. and more preferably within the range of 100 to 250° C., and is preferably carried out in an inert gas atmosphere. In addition, there are no particular limitations on pressure, and heat treatment may be carried out under pressure, under reduced pressure or at normal pressure. The duration of heat treatment is normally about 30 seconds to 90 minutes, preferably 1 to 70 minutes, and particularly preferably 5 to 60 minutes.

If the gas barrier laminate of the present invention is a laminated film, a laminated film (multilayer film) preferable as a heat-sealable packaging film can be obtained by laminating (superimposing) a heat-fused layer on at least one side thereof. Examples of the heat-fused layer include homo- or copolymers of known α-olefins ordinarily used as heat-fused layers, such as ethylene, propylene, butene-1, hexene-1,4-methyl-pentene-1 or octene-1, compositions containing one type or two or more types of polyolefins such as high-pressure low-density polyethylene, linear low-density polyethylene (so-called LLDPE), high-density polyethylene, polypropylene, polypropylene random copolymers, polybutene, poly-4-methyl-pentene-1, lowly crystalline or amorphous ethylene-propylene random copolymers or ethylene-butene-1 random copolymers, composition including one or two or more types of polyolefin such as propylene-butene-1 random copolymers, ethylene-vinyl acetate copolymer (EVA), ethylene-(meth) acrylic acid copolymer or metal salts thereof, and compositions of EVA and polyolefins.

In particular, heat-fused layers obtained from ethylene polymers such as high-pressure low-density polyethylene, linear low-density polyethylene (so-called LLDPE) or high-density polyethylene are preferable due to their superior low-temperature heat sealing properties and heat seal strength.

In the gas barrier laminate of the present invention, the previously described base material layer (I) may also be laminated on the surface of a gas barrier film of a gas barrier laminate or on the surface thereof on which the gas barrier film is not formed in accordance with various applications.

The following provides a more detailed explanation of the present invention using the following examples.

Example 1

(1) Reaction Step

A stirrer, thermometer, reflux condenser and three-way cock were attached to a 500 mL four-mouth round bottom flask, after which the inside of the flask was replaced with nitrogen. 162.18 g (2.25 mol) of acrylic acid and 80.94 g (4.49 mol) of deionized water were added to the flask after which stirring was started using a three-one motor. 33.056 g (0.75 mol as vinyl alcohol units, to apply similarly hereinafter) of polyvinyl alcohol (degree of polymerization: 1000, degree of saponification: 98.5 mol %, Kuraray, trade name: PVA110) and 0.1236 g (0.996 mmol) of p-methoxyphenol were added to the flask. After replacing the inside of the flask with a mixed gas of 2% oxygen and 98% nitrogen, 6.041 g (0.0597 mol) of 36% hydrochloric acid were added to the flask. The temperature was raised to 65° C. to start the reaction. Nine hours later, the reaction was stopped by diluting the reaction solution using 1275 g of deionized water to obtain 1548.68 g of polymer solution. The modification rate of acrylic acid-modified vinyl alcohol polymer in the resulting polymer solution was 7.5 mol % as determined by $^1$H-NMR. The concentration of acidic compounds in the resulting polymer solution was 1.454 mmol/g as determined by acid neutralization titration.

(2) Ion Exchange Step 1.5 L of conditioned Diaion WA30 (Mitsubishi Chemical) were filled into an ion exchange column followed by passing 687.76 g of the polymer solution obtained in the reaction step (acidic compound content: 1.00 mol) through the column at the rate of SV=5 to obtain 2331.5 g of a solution (B-1) containing acrylic acid-modified vinyl alcohol polymer. The concentration of unsaturated carboxylic acid-modified vinyl alcohol polymer in the solution (B-1) was measured to be 0.083 mmol/g. In addition, when the concentration of acidic compounds was measured by acid neutralization titration, acidic compounds were not detected.

Example 2

The same procedure as the reaction step and ion exchange step of Example 1 was carried out with the exception of using 7.592 g (0.0750 mol) of 36% hydrochloric acid in the reaction step. When the resulting polymer solution was measured by $^1$H-NMR, the modification rate of acrylic acid-modified vinyl alcohol polymer in the solution (B-2) was 8.8%, and acidic compounds were not detected by acid neutralization titration.

Example 3

The same procedure as the reaction step and ion exchange step of Example 1 was carried out with the exception of using 9.133 g (0.0902 mol) of 36% hydrochloric acid in the reaction step. When the resulting polymer solution was measured by $^1$H-NMR, the modification rate of acrylic acid-modified vinyl alcohol polymer in the solution (B-3) was 10.8%, and acidic compounds were not detected by acid neutralization titration.

Example 4

0.040 L of conditioned Diaion WA30 (Mitsubishi Chemical) were filled into an ion exchange column followed by passing 821.57 g of the polymer solution obtained in the reaction step of Example 1 (hydrochloric acid content: 30.84 mmol) through the column at the rate of SV=5 to obtain 849.22 g of a solution (C-4) containing acrylic acid-modified vinyl alcohol polymer and acrylic acid. The concentration of acrylic acid-modified vinyl alcohol polymer in the solution (C-4) was measured to be 0.43 mmol/g. The concentration of acidic compounds in the solution (C-4) was 1.279 mmol/g when measured by acid neutralization titration. In addition, quantification of Cl in the solution (C-4) as determined by combustion gas adsorption-ion chromatography yielded a value of 5 ppm by weight or less.

Example 5

(3) Neutralization Step A stirrer, thermometer and three-way cock were attached to a 200 mL three-mouth round bottom flask, and 70.0 g of the solution (C-4) obtained in Example 4 (acidic compound content: 87.8 mmol) were added to the flask. This solution was stirred using a three-one motor, and 3.572 g (43.9 mmol) of zinc oxide were added so that the reaction solution did not exceed 35° C. After allowing to react for 4 hours at 30° C., the small amount of undissolved zinc oxide remaining was filtered out to obtain 65.0 g of solution (D-5). The Zn content in the solution (D-5) was 4.1% by weight as quantified by ICP optical emission spectroscopy. In addition, the Cl content in the solution (D-5) was 5 ppm by weight or less as quantified by combustion gas adsorption-ion chromatography. The concentration of acrylic acid-modified vinyl alcohol polymer based on $^1$H-NMR analysis of the solution (D-5) was 0.32 mmol/g, and the concentration of acrylate groups was 1.11 mmol/g.

Example 6

A stirrer, thermometer, reflux condenser and three-way cock were attached to a 1000 mL four-mouth round bottom flask, after which the inside of the flask was replaced with nitrogen. 162.18 g (2.25 mol) of acrylic acid and 80.94 g (4.49 mol) of deionized water were added to the flask after which stirring was started using a three-one motor. 33.056 g (0.75 mol) of polyvinyl alcohol (degree of polymerization: 1000, degree of saponification: 98.5 mol %, Kuraray, trade name: PVA110) and 0.1236 g (0.996 mol) of p-methoxyphenol were added to the flask. After replacing the inside of the flask with a mixed gas of 2% oxygen and 98% nitrogen, 402 g of a solid acid catalyst in the form of PK208LH (anion exchange resin, Mitsubishi Chemical) were added to the flask. The temperature was raised to 80° C. to start the reaction. Nine hours later, the reaction was stopped by diluting the reaction solution using 1275 g of deionized water. The solid acid catalyst was then removed by filtration to obtain 1312.0 g of a solution (C-6). The modification rate of acrylic acid-modified vinyl alcohol polymer in the resulting solution (C-6) was 0.5 mol % as determined by $^1$H-NMR. The concentration of acidic compounds in the resulting solution (C-6) was 1.39 mmol/g as determined by acid neutralization titration.

Example 7

A photopolymerization initiator in the form of 1-[4-(2-hydroxyethoxy)-phenyl]-2-hydroxy-2-methyl-1-propan-1-one (Ciba Specialty Chemicals, trade name: Irgacure 2959), diluted to 25% by weight with methyl alcohol, and a surfactant (Kao Chemicals, trade name: Emulgen 120) were mixed with the solution (D-5) produced in Example 5 at solid fraction weight ratios of 1.1% by weight and 0.2% by weight, respectively (100% by weight in total) to obtain a coating solution.

Next, the coating solution was coated onto the corona treated surface of a base material film comprised of a biaxially stretched polyester film having a thickness of 12 μm (Unitika, trade name: Emblet PET12) with a Meyer bar to a solid content of 1.8 g/m$^2$ followed by drying using a hot air dryer. Subsequently, the base material film was promptly fixed to a stainless steel plate with the coated surface facing upward, and the coating solution was polymerized by irradiating with ultraviolet light under conditions of a UV intensity of 180 mW/cm$^2$ and cumulative light quantity of 180 mJ/cm$^2$ using a UV radiation apparatus (Eye Graphic, Eye Grandage Model ECS 301G1) to obtain a gas barrier laminated film. The resulting gas barrier laminated film was evaluated using the previously described methods.

The evaluation results are shown in Table 1.

Example 8

Example 8 was carried out in the same manner as Example 5 with the exception of changing the base material film used in Example 7 from a biaxially stretched film having a thickness of 12 μm (Unitika, trade name: Emblet PET12) to an aluminum oxide-deposited biaxially stretched polyethylene terephthalate film having a thickness of 12 μm (deposited PET: Tohcello, trade name: TL-PET H) to obtain a gas barrier laminated film. The resulting gas barrier laminated film was evaluated using the previously described methods.

The evaluation results are shown in Table 1.

<Evaluation Methods>

(1) Polymerization Rate (%): The polymerization rate of the unsaturated carboxylic acid compound polyvalent metal salt (c) in the present invention was determined using the measurement method described below.

Polymerization rate (%) : $[1-B_1/B]_{PostUV}/(B_1/B)_{Monomer}] \times 100$ $(B_1/B)_{postUV}$: $(B_1/B)$ after UV irradiation (after polymerization)

$(B_1/B)_{Monomer}$: $(B_1/B)$ of monomer (before polymerization)

Monomer: Unsaturated carboxylic acid compound polyvalent metal salt (c)

$(B_1/B)$ was defined as described below.

The ratio $(B_1/B)$ of absorbance $B_1$ based on δC—H of hydrogens bonded to vinyl groups in the vicinity of 830 cm$^{-1}$ to absorbance B based on a value of 0 for the vC for carboxylate ions in the vicinity of 1520 cm$^{-1}$ in the infrared absorption spectrum thereof is obtained by cutting out a measurement sample measuring 1 cm×3 cm from a gas barrier laminated film and measuring the infrared absorption spectrum by the infrared attenuated total reflectance (ATR) method, and absorbance $B_1$ and absorbance B are first determined using the procedure described below.

Absorbance $B_1$ based on δC—H of hydrogens bonded to vinyl groups in the vicinity of 830 cm$^{-1}$: The absorbances at 800 cm$^{-1}$ and 850 cm$^{-1}$ of the infrared absorption spectrum are connected with a line (P), a line (Q) is dropped down vertically from the maximum absorbance (in the vicinity of 830 cm$^{-1}$) between 800 and 850 cm$^{-1}$, and the absorbance distance (length) between the intersection of lines (Q) and (P) and the maximum absorbance is taken to be absorbance $B_1$.

Absorbance B based on a value of 0 for the vC for carboxylate ions in the vicinity of 1520 cm$^{-1}$: The absorbances at 1480 cm$^{-1}$ and 1630 cm$^{-1}$ of the infrared absorption spectrum are connected with a line (L), a line (M) is dropped down vertically from the maximum absorbance (vicinity of 1520 cm$^{-1}$) between 1480 and 1630 cm$^{-1}$, and absorbance distance (length) between the intersection of lines (M) and (L) and the maximum absorbance was taken to be absorbance B. Furthermore, the location of the peak indicating maximum absorbance (vicinity of 1520 cm$^{-1}$) changes according to the counter ion metal species used, and for example, is in the vicinity of 1520 cm$^{-1}$ in the case of calcium, in the vicinity of 1520 cm$^{-1}$ in the case of zinc, and in the vicinity of 1540 cm$^{-1}$ in the case of magnesium.

Next, the ratio of $(B_1/B)$ was determined from the absorbance $B_1$ and the absorbance B determined in the manner described above.

In addition, polymerization rate is determined by measuring the absorbance ratio $(B_1/B)$monomer of the monomer and the absorbance ratio $(B_1/B)_{postUV}$ following UV irradiation (polymerization)

Furthermore, measurement of infrared spectra (measurement of attenuated total reflection (ATR)) in the present invention is carried out by using the FT-IR350 system manufactured by Jasco Corp. and installing a KRS-5 (thallium bromide-iodide) crystal under conditions consisting of an incident angle of 45 degrees, room temperature, resolution of 4 cm$^{-1}$ and 150 integration cycles.

(2) Absorbance ratio ($A_0/A$) : This was measured using the previously described method.

(3) Oxygen permeability [ml/(m$^2$·day·MPa)] : A gas barrier laminated film or a multilayer film laminated with a linear low-density polyethylene film to be described later was measured using the OX-TRAN2/21 manufactured by Mocon Inc. after adjusting for 3 hours under conditions of a temperature of 20° C. and humidity of 90% RH in accordance with JIS K 7126 (equal pressure method), and using the OX-TRAN2/20 SM manufactured by Mocon Inc. after adjusting for 3 hours under conditions of a temperature of 20° C. and humidity of 0% RH in accordance with JIS K 7126 (equal pressure method).

(4) Production of Multilayer Film: After coating and drying a urethane adhesive (12 parts by weight of a polyurethane adhesive (Mitsui Takeda Chemicals, trade name: Takelac A310) and 1 part by weight of an isocyanate curing agent (Mitsui Takeda Chemicals, trade name: Takenate A3)) and ethyl acetate (Kanto Chemical, 7parts by weight) onto one side of a linear low-density polyethylene film having a thickness of 50 μm (Tohcello, trade name: T.U.X. FCS), a multilayer film was produced by laminating (dry laminating) the zinc acrylate polymer sides (polymer layer of the unsaturated carboxylic acid compound polyvalent metal salt (c)) of the gas barrier laminated films obtained in the examples and reference examples.

(5) Boiling Treatment: The multilayer films obtained according to the method described above were treated for 30 minutes in hot water at 95° C.

(6) Heat Seal Strength (HS Strength: N/15 mm): Using multilayer films obtained according to the method described above, the corresponding linear low-density polyethylene film sides of the multilayer films were heat-sealed for 1 second at 130° C. and 2 kg/cm$^2$ followed by sampling a width of 15 mm and measuring heat seal strength at a speed of 300 mm/min using a tensile tester (Orientech, Tensilon Universal Tester RTC-1225) under conditions of a temperature of 23° C. and humidity of 50% RH.

Reference Example 1

A gas barrier laminated film was obtained by carrying out Reference Example 1 in the same manner as Example 7 with the exception of using a coating solution obtained by preparing a zinc acrylate solution so that the solid content concentration in water was 16% by weight instead of the coating solution used in Example 7. The resulting gas barrier laminated film was evaluated according to the methods described above.

The evaluation results are shown in Table 1.

Reference Example 2

A gas barrier laminated film was obtained in the same manner as Reference Example 1 with the exception of changing the base material film used in Reference Example 1 from a biaxially stretched polyester film having a thickness of 12 μm (Unitika, trade name: Emblet PET12) to aluminum oxide-deposited biaxially stretched polyethylene terephthalate film having a thickness of 12 μm (Deposited PET, Tohcello, trade name: TL-PET H) . Next, the resulting gas barrier laminated film was laminated with a linear low-density polyethylene film using the same method as described above to obtain a multilayer film. The resulting multilayer film was evaluated according to the methods described above.

The evaluation results are shown in Table 1.

TABLE 1

| | Coating Solution | Polymerization Rate % | Absorbance Ratio A/A0 |
|---|---|---|---|
| Example 7 | D-5 | 90.8 | 0.09 |
| Example 8 | D-5 | 96.3 | 0.08 |
| Reference Example 1 | — | 92.4 | 0.07 |
| Reference Example 2 | — | 92.1 | 0.08 |

| | Oxygen Permeability (ml/(m² · day · MPa)) | | | |
|---|---|---|---|---|
| | 0% RH | 90% RH | 90% RH after boiling | HS strength N/15 mm |
| Example 7 | 8.3 | 1.4 | 15.5 | 27.1 |
| Example 8 | 0.4 | 0.3 | 0.6 | 30.9 |
| Reference Example 1 | 79.0 | 1.1 | 2.0 | 21.5 |
| Reference Example 2 | 4.5 | 0.1 | 2.6 | 20.8 |

As is clear from Table 1, in a system containing the unsaturated carboxylic acid-modified vinyl alcohol polymer (b), oxygen barrier properties at low humidity are improved, and in contrast hot water resistance being improved without the occurrence of delamination and the like caused by boiling treatment, in systems in which the unsaturated carboxylic acid-modified vinyl alcohol polymer (b) is not added (Reference Example 1 and Reference Example 2), although oxygen barrier properties and hot water resistance are superior at 90% RH, oxygen barrier properties decrease at low humidity.

INDUSTRIAL APPLICABILITY

According to the present invention, a solution containing an unsaturated carboxylic acid-modified vinyl alcohol polymer (b) useful as a gas barrier coating material, and a gas barrier film in which it is used, are obtained.

Moreover, since a gas barrier film comprised of a polymer of an unsaturated carboxylic acid compound polyvalent metal salt (c) containing the unsaturated carboxylic acid-modified vinyl alcohol polymer (b) of the present invention, as well as a gas barrier laminate comprised by forming that gas barrier film, have superior resistance to oxygen permeability (gas barrier properties) at both high and low humidity, this characteristic can be taken advantage of to enable their preferable use in packaging materials of dried foods, liquids, boiled retorted foods or food supplements, and particularly as food packaging materials of contents requiring high gas barrier properties, as well as in packaging materials of toiletries such as shampoos, soaps, bath additives or air fresheners, medical applications including packaging materials for pharmaceuticals such as powders, granules or tablets, packaging materials for liquid pharmaceuticals such as infusion bags, and packaging bags and packaging materials for medical instruments, packaging materials for electronic components such as hard disks, wiring boards and printed circuit boards, barrier materials for flat panel displays including liquid crystal displays, plasma displays, inorganic and organic EL displays or electronic paper, electronic materials for barrier materials of solar cells, barrier materials for vacuum thermal insulators, packaging materials for industrial products such as ink cartridges, and packaging materials for various other products, or in protective materials of materials incompatible with permeation of oxygen gas and humidity, such as electronic materials, precision components and pharmaceuticals.

The invention claimed is:

1. A method for producing a solution (D) containing an unsaturated carboxylic acid-modified vinyl alcohol polymer (b) and an unsaturated carboxylic acid compound polyvalent metal salt (c),
   the method comprising:
   (1) a reaction step for bringing about a reaction between a vinyl alcohol polymer and an unsaturated carboxylic acid compound (a) in the presence of an acid catalyst that is soluble in a reaction system, and forming the unsaturated carboxylic acid-modified vinyl alcohol polymer (b);
   (2) an ion exchange step for removing at least the acid catalyst using an anion exchange resin; and
   (3) a neutralization step for neutralizing unreacted unsaturated carboxylic acid compound (a) remaining from the reaction step (1) and ion exchange step (2) using a polyvalent metal compound, and forming the unsaturated carboxylic acid compound polyvalent metal salt (c).

2. The method for producing the solution (D) according to claim 1, wherein the reaction step is carried out in the presence of a solvent.

3. The method for producing the solution (D) according to claim 2, wherein the solvent used in the reaction step is a polar solvent.

4. The method for producing the solution (D) according to claim 3, wherein the solvent used in the reaction step is water.

5. The method for producing the solution (D) according to claim 1, wherein the degree of saponification of the vinyl alcohol polymer used in the reaction step is 70% or more.

6. The method for producing the solution (D) according to claim 1, wherein the unsaturated carboxylic acid compound (a) is an α,β-unsaturated carboxylic acid.

7. The method for producing the solution (D) according to claim 1, wherein the unsaturated carboxylic acid compound (a) is an unsaturated carboxylic acid compound having 10 carbon atoms or less.

8. The method for producing the solution (D) according to claim 1, wherein the unsaturated carboxylic acid compound (a) is acrylic acid or methacrylic acid.

9. The method for producing the solution (D) according to claim 1, wherein the acid catalyst soluble in the reaction system used in the reaction step is an inorganic acid or organic sulfonic acid.

10. The method for producing the solution (D) according to claim 9, wherein the acid catalyst soluble in the reaction system used in the reaction step is an inorganic acid.

11. The method for producing the solution (D) according to claim 10, wherein the acid catalyst soluble in the reaction system used in the reaction step is hydrochloric acid.

12. The method for producing the solution (D) according to claim 1, wherein the modification rate for the unsaturated carboxylic acid-modified vinyl alcohol polymer (b) is 0.1 to 30 mol % based on hydroxyl groups of raw material vinyl alcohol polymer.

13. The method for producing the solution (D) according to claim 1, wherein polyvalent metal atoms of the polyvalent metal compound used in the neutralization step are Mg, Ca, Zn, Ba, Al or Ti.

14. The method for producing the solution (D) according to claim 1, wherein in the neutralization step, the amount of polyvalent metal atoms of the polyvalent metal compound used based on 1 mole of acidic groups of the unsaturated carboxylic acid compound (a) is within the range of 0.1 to 10 moles.

15. A solution (D) containing the unsaturated carboxylic acid-modified vinyl alcohol polymer (b) and the unsaturated carboxylic acid compound polyvalent metal salt (c) obtained according to the production method according to claim 5.

16. A gas barrier film obtained by polymerization of a coating solution of the solution (D) according to claim 15.

17. The gas barrier film according to claim 16 obtained polymerization of a coating solution of a solution in which the content of the unsaturated carboxylic acid-modified vinyl alcohol polymer (b) in the solution is 50% by weight or less and the unsaturated carboxylic acid compound polyvalent metal salt (c) exceeds 50% by weight.

18. The gas barrier film according to claim 16, wherein in the gas barrier film a ratio ($A_0/A$) of absorbance $A_0$, based on a value of 0 for the vC of carboxylic acid groups in the vicinity of 1700 $cm^{-1}$ in the infrared absorption spectrum thereof, to absorbance A, based on a value of 0 for the vC of carboxylate ions in the vicinity of 1520 $cm^{-1}$, is less than 0.25.

19. The gas barrier film according to claim 16, wherein the unsaturated carboxylic acid-modified vinyl alcohol polymer (b) is a (meth)acrylic acid-modified vinyl alcohol polymer.

20. The gas barrier film according to claim 16, wherein the polyvalent metal of the unsaturated carboxylic acid compound polyvalent metal salt is at least one type selected from Mg, Ca, Zn, Ba, Al and Ti.

21. A gas barrier laminate comprising the formation of the gas barrier film according to claim 16 on at least one side of a base material layer (I).

22. A method for producing a gas barrier film or a gas barrier laminate,
the method comprising: coating a solution (D) containing an unsaturated carboxylic acid-modified vinyl alcohol polymer (b) which is obtained by modifying vinyl alcohol polymer having a saponification degree of 70% or more, and an unsaturated carboxylic acid compound polyvalent metal salt (c) onto at least one side of a base material or a base material layer (I), followed by forming a polymer (X) of the unsaturated carboxylic acid compound polyvalent metal salt (c) containing the unsaturated carboxylic acid-modified vinyl alcohol polymer (b).

23. The method for producing a gas barrier film or a gas barrier laminate according to claim 22, wherein the content of the unsaturated carboxylic acid-modified vinyl alcohol polymer (b) is 50% by weight or less.

24. The method for producing a gas barrier film or a gas barrier laminate according to claim 21, wherein the unsaturated carboxylic acid compound (a) is (meth)acrylic acid.

25. The method for producing a gas barrier film or a gas barrier laminate according to claim 22, wherein the solution is an aqueous solution.

26. The method for producing a gas barrier film or a gas barrier laminate according to claim 21, wherein polymerization of the unsaturated carboxylic acid compound polyvalent metal salt (c) is carried out in the presence of moisture.

* * * * *